(12) United States Patent
Dong et al.

(10) Patent No.: US 10,638,656 B2
(45) Date of Patent: May 5, 2020

(54) APPARATUS HAVING AUTOMATICALLY ADJUSTABLE POT SEEDLING FEED RATE AND METHOD THERFOR

(71) Applicant: Jiangsu University, Zhenjiang (CN)

(72) Inventors: Lili Dong, Zhenjiang (CN); Hao Yuan, Zhenjiang (CN); Shuyou Zheng, Zhenjiang (CN); Fuzhu Li, Zhenjiang (CN)

(73) Assignee: Jiangsu University, Zhenjiang, Jiangsu (CN)

( * ) Notice: Subject to any disclaimer, the term of this patent is extended or adjusted under 35 U.S.C. 154(b) by 291 days.

(21) Appl. No.: 15/736,612

(22) PCT Filed: Jun. 3, 2016

(86) PCT No.: PCT/CN2016/084689
§ 371 (c)(1),
(2) Date: Dec. 14, 2017

(87) PCT Pub. No.: WO2016/202179
PCT Pub. Date: Dec. 22, 2016

(65) Prior Publication Data
US 2018/0192579 A1    Jul. 12, 2018

(30) Foreign Application Priority Data
Jun. 15, 2015   (CN) .......................... 2015 1 0328739

(51) Int. Cl.
*B65G 23/44* (2006.01)
*B65G 23/00* (2006.01)
(Continued)

(52) U.S. Cl.
CPC .............. *A01C 11/02* (2013.01); *A01G 9/086* (2013.01)

(58) Field of Classification Search
None
See application file for complete search history.

(56) References Cited

U.S. PATENT DOCUMENTS 3,643,817 A * 2/1972 Rose .................... B65G 57/302
414/795.3
4,461,380 A * 7/1984 Grikis ................ B65G 47/1428
198/389

(Continued)

FOREIGN PATENT DOCUMENTS

| CN | 201167475 | 12/2008 |
|---|---|---|
| CN | 103787051 | 5/2014 |

(Continued)

OTHER PUBLICATIONS

PCT International Search Report for corresponding PCT Application No. PCT/CN2016/084689, dated Sep. 8, 2016—2 pages.

*Primary Examiner* — Kavel Singh
(74) *Attorney, Agent, or Firm* — Dority & Manning, P.A.

(57) ABSTRACT

An apparatus having an automatically adjustable pot seedling feed rate and a method therefor are provided. In some embodiments, the apparatus comprises a pot seedling scooper, a conveyance unit, a detection sensor, a controller, a seedling sorting unit, side panels, and brackets. The conveyance unit comprises a servomotor, a transmission shaft, a conveyor belt, a tension shaft, and a bearing. The seedling sorting unit comprises a seedling sorting rod, a reset spring, a guide post and a support seat.

15 Claims, 3 Drawing Sheets

(51) Int. Cl.
    *B65G 15/00*     (2006.01)
    *A01C 11/02*     (2006.01)
    *A01G 9/08*     (2006.01)

(56) References Cited

U.S. PATENT DOCUMENTS

| | | | |
|---|---|---|---|
| 6,863,171 B2 * | 3/2005 | Blok | B65G 47/525 198/370.02 |
| 2007/0278139 A1 * | 12/2007 | Cowling | B07C 5/36 209/606 |

FOREIGN PATENT DOCUMENTS

| | | |
|---|---|---|
| CN | 104838781 | 8/2015 |
| CN | 104919954 | 9/2015 |
| JP | H08308346 | 11/1996 |
| JP | H09205834 | 8/1997 |

* cited by examiner

APPARATUS HAVING AUTOMATICALLY ADJUSTABLE POT SEEDLING FEED RATE AND METHOD THERFOR

FIELD

The present disclosure relates to an automatic adjustable pot seedling feeding speed device and its application method, belonging to the field of agricultural machinery technology. This device with automatic transmission and automatic separation of the pot seedling is applied to the seedling transplanter of vegetables, flowers, tea, etc.

BACKGROUND

Advantages of pot seedling transplanting are as follows: (1) growth periods of vegetables can be shortened, crop arrangement is facilitated and land utilization is improved; (2) the root system of pot seedling will grow well after the seedlings are planted in the soil, which can provide convenient conditions for follow-up management. Since there is no suitable supporting machinery, the production of vegetables and flowers have been labor intensive industries for a long time. It relies on manual transplanting with high labor intensity, low work efficiency and low transplanting quality, besides, it is difficult to work on large area of land for farmers. Labor cost accounts for over 50% of the total production cost and farmers have to produce in small-scale land with low production efficiency, which restricts the development of vegetable and flower planting industry. Mechanized transplanting can reduce labor intensity, improve work efficiency and the survival pot seedling rate, and it can also improve economic returns and social benefits compared with the traditional manual-transplanting. It is becoming increasing popular with vegetable and flower producers.

The purpose of the pot seedling feeding mechanism is to deliver a pot seedling into a planter real-time. But, the rotary holding cup structure of existing semi-automatic transplanters is usually used for the seedlings feeding system, only one pot seedling can be fed at a time, and the operations cannot be discontinuous. The labor intensity is relatively high and the operators will become tired easily. As a result the seedling is missed and the transplant quality goes down, so the transplanting speed is relatively slow.

A fully-automatic transplanter has an automatic seedling feeding system and a high transplanting speed, which does not require manual seedling feeding. However, the fully-automatic transplanter has a relatively complex mechanism system and a very high cost. It is not suitable for medium-scale and small-scale users.

China Patent Application No. 201210317407.8 discloses an automatic seedling picking and feeding mechanism for plug seedling transplanter, an automatic seedling picking and feeding mechanism for plug seedling transplanter. The transplanter includes a displacement mechanism, a support stand, a slide rod, a connecting-rod mechanism, and a seedling clamping mechanism. The support stand can be installed on the displacement mechanism so as to implement position switching of the support stand between a seedling picking action and a seedling feeding action. One end of the slide rod can be inserted in a slide sleeve movable inside a slide groove on the support stand, and the other end of the slide rod can be connected to the seedling clamping mechanism. The displacement mechanism can be used to implement switching of the seedling clamping mechanism between a seedling picking procedure position and a seedling feeding procedure position. The connecting-rod mechanism can be used to control the rotation of the slide rod and the seedling clamping mechanism and implement closing and opening of a seedling clamp. The apparatus has a relatively complex structure and a relatively high production cost, and the seedling clamping mechanism of the apparatus cannot precisely position a pot seedling in a seedling clamping process, which results in the loss of seedlings.

China patent application No. 2011101335051 discloses a mechanical seedling feeding transplanter, a mechanical seedling feeding mechanism which can replace manual operation. Multiple pot seedlings can be placed into a mechanical seedling feeding system each time, with the control of electric-control system, the seedling feeding mechanism can drop seedlings automatically by using delivery cups. Thereby this mechanism improves the speed and efficiency of transplanting work, meanwhile the production cost was reduced. However, the seedling feeding mechanism has a complex design and a relatively large quantity of parts. In addition, this mechanism is the continuous transmission of a transmission chain driven, which will inevitably produce discontinuous phenomena when feeding the pot seedling twice. It will result in the failure of the feeding time, the absence of pot seedling in planting and reduce transplanting quality.

SUMMARY

Aspects and advantages of embodiments of the present disclosure will be set forth in part in the following description, or may be learned from the description, or may be learned through practice of the embodiments.

One example aspect of the present disclosure is directed to an automatic adjustable pot seedling feeding speed device. The pot seedling feeding speed device can include a pot seedlings shovel and a conveyor unit. The conveyor unit can include a servo motor, a transmission shaft, a conveyor belt, a tensioning shaft, and bearings. The servo motor can be mechanically coupled to the transmission shaft. The tensioning shaft is configured to keep the conveyor belt in a tensioned state. The servo motor is configured to drive the conveyor built in order to move one or pot seedlings positioned thereon. The pot seedling feeding speed device can include a controller configured to control operation of the servo motor.

In example embodiments, the pot seedling feeding speed device can include a pot seedlings shovel used for a single delivery of multiple pot seedlings. The pot seedling feeding speed device can also include a seedling separation unit used for separating pot seedlings and correcting a feeding posture (e.g. orientation) of a pot seedling. In example embodiments, the seedling separation unit can include a seedling separation rod, a support seat, a reset spring, an adjustment plate, a guide post, a brake cable, and a sleeve tube. The seedling separation rode and the guide post can be removably coupled to the adjustment plate. More specifically, the seedling separation rod and the guide post can extend through guide holes defined by the support seat.

DETAILED DESCRIPTION OF THE EMBODIMENTS

Figure 1:
FIG. 1 provides a schematic view of a pot seedling shovel in accordance with example embodiments of the present disclosure.

Reference will now be made in detail to example embodiments of the present disclosure, one or more examples of which are illustrated in the accompanying drawings.

In view of the major technical deficiencies and defects in the existing seedlings feeding mechanism for transplanters, disclosure provides a feeding speed adjustable pot seedling feeding mechanism. The efficiency of the feeding system is improved by placing multiple pot seedlings each time, the labor intensity and nervousness of workers can be reduced, time saving and labor saving are implemented; besides, the efficiency and quality of mechanical seedling feeding are improved. The quality of transplanting pot seedling of transplanter is improved by correcting the pot seedling feeding posture.

In example embodiments, an automatic adjustable pot seedling feeding speed device includes a conveyor unit, a pot seedlings shovel, a controller, side plates, and support stands. The conveyor unit of the device includes a servo motor, a transmission shaft, a conveyor belt, a tensioning shaft, and bearings. The servo motor is linked to the transmission shaft. The tensioning shaft and the transmission shaft keep the conveyor belt in a tensioned state. The conveyor unit is driven by using the servo motor, where the transmission shaft and the conveyor belt move to transfer a pot seedling, and the controller of the device is used to control the servo motor of the conveyor unit.

The automatic adjustable pot seedling feeding speed device also includes a pot seedlings shovel used for a single delivery of multiple pot seedlings. The pot seedling feeding speed device also includes a seedling separation unit that is configured to separate seedlings and correct the feeding posture of a pot seedling. The seedling separation unit can include a seedling separation rod, a support seat, a reset spring, an adjustment plate, a guide post, a brake cable, and a sleeve tube. The seedling separation rod and the guide post can be removably coupled to the adjustment plate via a mechanical fastener (e.g., bolt. Alternatively, the seedling separation rod and the guide post can each be welded to the adjustment plate. In example embodiments, the support seat defines a plurality of guide holes configured to receive the seedling separation rod and the guide post. More specifically, the seedling separation rod extends through a first guide hole of the plurality of guide holes, whereas the guide post extends through a second guide hole of the plurality of guide holes. In example embodiments, the support seat is removably coupled to the side plate via any suitable mechanical fastener (e.g., bolt). Alternatively, the support seat can be welded to the side plate.

In example embodiments, the pot seedling feeding speed device can include a detection sensor configured to detect whether a pot seedling reaches a seedling separation position. The detection sensor can be mounted on the side plate at a pot seedling pre-feeding position. The detection sensor can be configured to send an instruction to the controller to run or stop the servo motor. When the detection sensor does not detect a pot seedling, the detection sensor sends an instruction to the controller to run the servo motor to transfer a pot seedling to a side of the seedling separation rod at the pre-feeding position and wait for seedling feeding. When the detection sensor detects that a pot seedling reaches the pre-feeding position beside the seedling separation rod or a pot seedling is already positioned at the pre-feeding position, the detection sensor sends an instruction to the controller to stop the servo motor. In this manner, the pot seedling cannot be damaged due to running of the conveyor belt.

In example embodiments, pot seedling feeding speed device allows an operator to simultaneously place multiple pot seedlings on the conveyor belt. In this manner, excessive fatigue caused by repetitive can be reduced. In example embodiments, the servo motor of the conveyor unit can be replaced with a step motor, a numerically controlled hydraulic motor, or a pneumatic motor.

In example embodiments, the side plates define a folded trumpet shape so that the operator can place a number of pot seedlings on the conveyor belt of the conveyor unit at a time. Alternatively, the side plates can define a straight edge without folding.

In example embodiments, the seedling separating unit can be mounted on the side plate at a relatively low end or portion of the conveyor unit. The brake cable of the seedling separation unit can be controlled by the brake cable position switch installed on the planter. When a seedling receiving barrel of the planter moves to a seedling receiving position under the seedling separation rod, the brake cable is controlled via the brake cable position switch, the seedling separation rod is ejected, and at the same time drives the servo motor to drive the conveyor belt to carry a pot seedling on the conveyor belt. In example embodiments, the pot seedling feeding speed device can include a position switch or a sensor control to control the seedling feeding action.

In example embodiments, the brake cable is positioned in the middle of the guide post and the seedling separation rod. In addition, both the seedling separation rod and the guide post are movable into and out of the first and second guide holes, respectively. The clearance defined between the first guide hole and the seedling separation rod can be any suitable value. Likewise, the clearance defined between the second guide hole and the seedling separation rod can be any suitable value. In this manner, the clearance can guarantee the free axial movement of the guide post and the seedling separation rod, which can guarantee the free ejection and reset of the seedling separation rod, and smooth realization of the feeding action.

When feeding the pot seedling, the seedling separation rod adjusts orientation of the pot seedling to improve the quality of pot seedling transplanting.

In example embodiments, the seedling separation rod is controlled via the brake cable and the sleeve tube. Alternatively, the seedling separation rod can be controlled according to movement of the planter through coordination and matching calculation. The seedling separation rod is ejected to correct the drop posture (e.g. orientation) of the pot seedling, but it can also move away from the other direction without correcting the pot seedling effect, and correct the drop posture of the pot seedling by adding other devices or parts. The controller of the servo motor receives a control signal from the detection sensor and another control signal from the seedling separation unit, thereby avoiding excessive fatigue and nervous tension caused by frequent repetitive actions and over seedling missing during manual direct seedling feeding.

Preferred to, the automatic adjustable pot seedling feeding speed device can also be used in juxtaposition combination with 2, 3 or more, thereby realizing the multi-line automatic feeding of seedlings and transplanting.

In example embodiments, a method of using the pot seedling speed device includes placing a number of pot seedlings onto the conveyor belt using a pot seedlings shovel. The detection sensor detects the pot seedlings on the conveyor belt and sends a control signal to the controller drive the servo motor via the transmission shaft. As the pot seedling moves along the conveyor belt and enters a pre-feeding position in front of a seedling separation rod, the detection sensor detects the pot seedling and sends a control signal to the controller so that the controller stops the servo motor.

When a planter of the transplanter travels to a seedling receiving position under the seedling separation rod, the brake cable is retracted, and the seedling separation rod is ejected under the effect of the sleeve tube and the guide post. At the same time, a control signal is sent to the controller to rotate the servo motor over the position of one pot seedling. A pot seedling located at the pre-feeding position and the end of the conveyor belt is moved forward under the effect of the conveyor belt, and drops in a seedling receiving barrel of the planter under the effect of gravity, thereby implementing seedling feeding. At that moment when the pot seedling is dropped, the ejected seedling separation rod corrects a feeding posture of the pot seedling by blocking the stein and leaves of the pot seedling, thereby improving the quality of pot seedling transplanting.

After the planter of the transplanter receives the seedling and travels to the seedling receiving position, the brake cable is released, and the seedling separation rod is returned to the position of the block pot seedling under the effect of the reset spring, until the planter travels to the seedling receiving position under the seedling separation rod again. In this case, the detection sensor detects the pot seedling and sends information to the controller to stop the servo motor and wait for the next time of seedling feeding. At this point, the seedling feeding system makes one complete cycle of pot seedling feeding and starts a new cycle.

After the operator places a last group of pot seedlings on the conveyor unit, the operator then prepares another group of pot seedlings, and waits for an opportunity to place this group of pot seedlings on the conveyor belt of the conveyor unit; this ensures the pot seedlings to be transplanted continuously. According to the foregoing order, mechanical and continuous seedling pot feeding of the automatic adjustable pot seedling feeding speed device for a transplanter is implemented.

The pot seedling feeding speed device includes a pot seedlings shovel configured to simultaneously place a number of pot seedlings on the conveyor belt of the conveyor unit at a time. The pot seedling feeding speed device also includes the detection sensor for detecting whether a pot seedling is in proper position inside the device is connected on the side plate at a pot seedling pre-feeding position. It then sends an instruction to the controller to run or stop the servo motor. When the sensor does not detect a pot seedling, it sends an instruction to run the servo motor to transfer a pot seedling to the side of the seedling separation rod at the pre-feeding position to wait for seedling feeding. When the sensor detects that a pot seedling reaches the pre-feeding position beside the seedling separation rod or a pot seedling exists at the pre-feeding position, it sends an instruction to stop the servo motor so as to prevent the pot seedling from being damaged due to running of the conveyor belt.

The present disclosure provides an automatic adjustable pot seedling feeding speed device. The control for the seedling separation rod movement of this device contains direct control and indirect control. The direct control is from the planter by using the brake cable and the sleeve tube. The indirect control is implemented according to movement of the planter through coordination and matching calculation. The controller of the servo motor receives a control signal from the detection sensor and another control signal from the seedling separation unit, thereby avoiding nervous tension caused by over seedling missing during manual direct seedling feeding. The pot seedlings shovel can place a number of pot seedlings on the conveyor belt of the conveyor unit at a time, thereby avoiding excessive fatigue caused by frequent repetitive actions during manual direct seedling feeding.

The present disclosure provides an automatic adjustable pot seedling feeding speed device and its brake cable control structure. The brake cable is in the middle of the guide post and the seedling separation rod, the guide post and its guide hole are the sliding fit, and the seedling separation rod and its guide hole are the sliding fit too. The clearance of the guide post and its guide hole should not be too large or too small, and the clearance of the seedling separation rod and its guide hole should not be too large or too small. The clearance can guarantee the free axial movement of the guide post and the seedling separation rod in the guide hole, which can guarantee the free ejection and reset of the seedling separation rod. The seedling separating unit is mounted on the side plate at a relatively low end of the conveyor unit. The brake cable of the seedling separation unit is controlled by the planter. When a seedling receiving barrel of the planter moves to a seedling receiving position under the seedling separation rod, the brake cable is controlled by using the brake cable position switch, the seedling separation rod is ejected, and at the same time drives the servo motor to drive the conveyor belt to carry a pot seedling and move forward. A pot seedling drops in a seedling receiving barrel of the planter under the effect of gravity when it is moved to the end of the conveyor belt. At that moment when the pot seedling is dropped, the ejected seedling separation rod corrects a feeding posture of the pot seedling, which can guarantee the smooth realization of the feeding action and improve the quality of pot seedlings transplanting.

The automatic pot seedling feeding speed device according to example embodiments of the present disclosure has numerous benefits. For example, this automatic feeding device ensures that multiple pot seedlings are placed on the conveyor belt of the conveyor unit at a time and continuous automation for delivery and ensures the pot seedlings are properly separated during the task process of the transplanter. This avoids excessive fatigue caused by frequent repetitive actions of an operator during direct seedling feeding and nervous tension over seedling missing. In addition, and the transplanting efficiency and the transplanting quality are also improved, and the basis is provided for automatic transplanting.

FIG. 1 is a schematic view of a pot seedlings shovel 1 of an automatic adjustable pot seedling feeding speed device according to example embodiments of the present disclosure. The pot seedlings shovel 1 allows an operator to quickly place multiple pot seedlings on a conveyor belt of a conveyor unit 4 of the automatic adjustable pot seedling feeding speed device.

Figure 2:
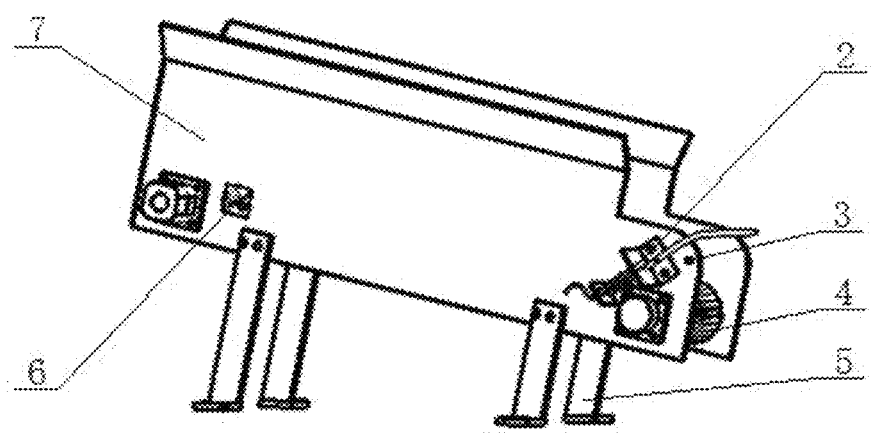
FIG. 2 provides a schematic view of an automatic adjustable pot seedling feeding speed device according to example embodiments of the present disclosure.

FIG. 2 is a schematic structural view of an automatic adjustable pot seedling feeding speed device in this present disclosure. This device includes a conveyor unit 4 for a pot seedling to be transferred, side plates 7 facilitating quickly placement of a pot seedling, and support stands 5 for mounting a seedling feeding system on the transplanter. The device has a seedling separation unit 2 used for separating seedlings and correcting a feeding posture of a pot seedling and a detection sensor 3 that detects whether a pot seedling reaches a seedling separation position. The device also includes a controller 6 which drives a servo motor. The controller 6 can receive signals from the detection sensor 3 and the seedling separation unit 2, thereby avoiding nervous tension of an operator over seedling missing during direct seedling feeding.

Figure 3:
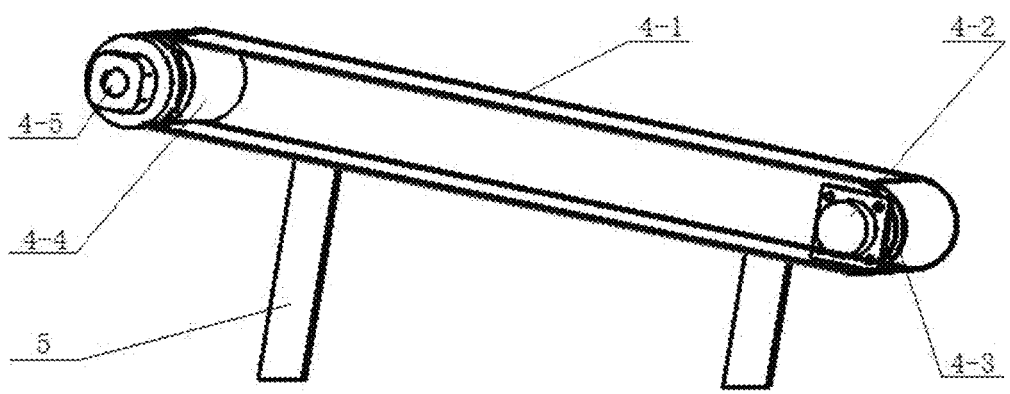
FIG. 3 provides a schematic view of a conveyor unit of the automatic adjustable pot seedling feeding speed device according to example embodiments of the present disclosure.

FIG. 3 is a structural view of a conveyor unit of an automatic adjustable pot seedling feeding speed device in this present disclosure. The conveyor unit 4 has a servo motor 4-5, a transmission shaft 4-4, a conveyor belt 4-1, a tensioning shaft 4-3, and bearings 4-2. The servo motor 4-5 is linked to the transmission shaft 4-4. The conveyor belt 4-1 is mounted on the transmission shaft 4-4 and the tensioning shaft 4-3. Both ends of the transmission shaft 4-4 and both ends of the tensioning shaft 4-3 are mounted on the side plates 7 on both sides with the use of bearings 4-2. The servo motor 4-5 may drive, by using the transmission shaft 4-4 and the conveyor belt 4-1, a pot seedling to move. The conveyor unit 4 has a simple structure and may allow an operator to place multiple pot seedlings at a time conveniently, thereby relieving excessive fatigue caused by frequent repetitive actions.

Figure 4:
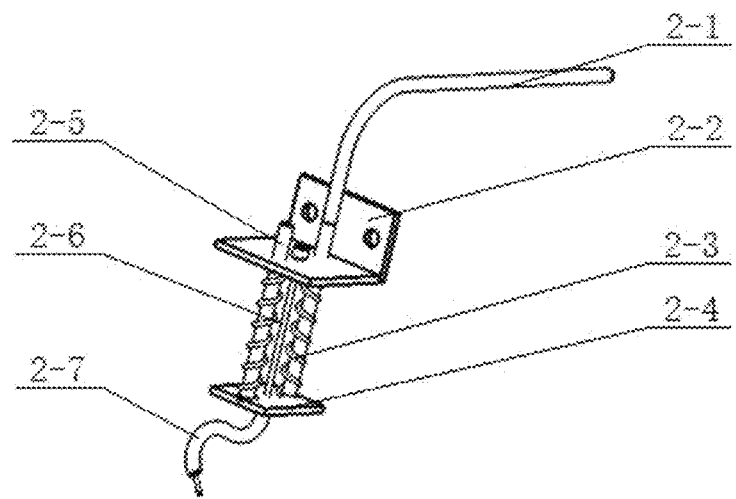
FIG. 4 provides a schematic view of a seedling separation unit of the automatic adjustable pot seedling feeding speed device according to example embodiments of the present disclosure.
Figure 5:
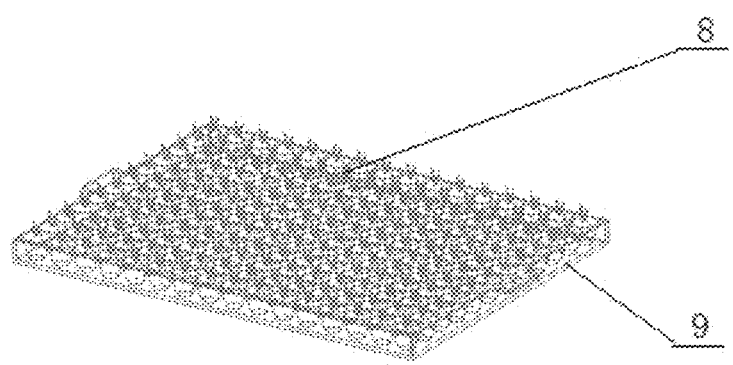
FIG. 5 provides a schematic view of the pot seedling for automatic mechanical transplanting according to example embodiments of the present disclosure.
Figure 6:
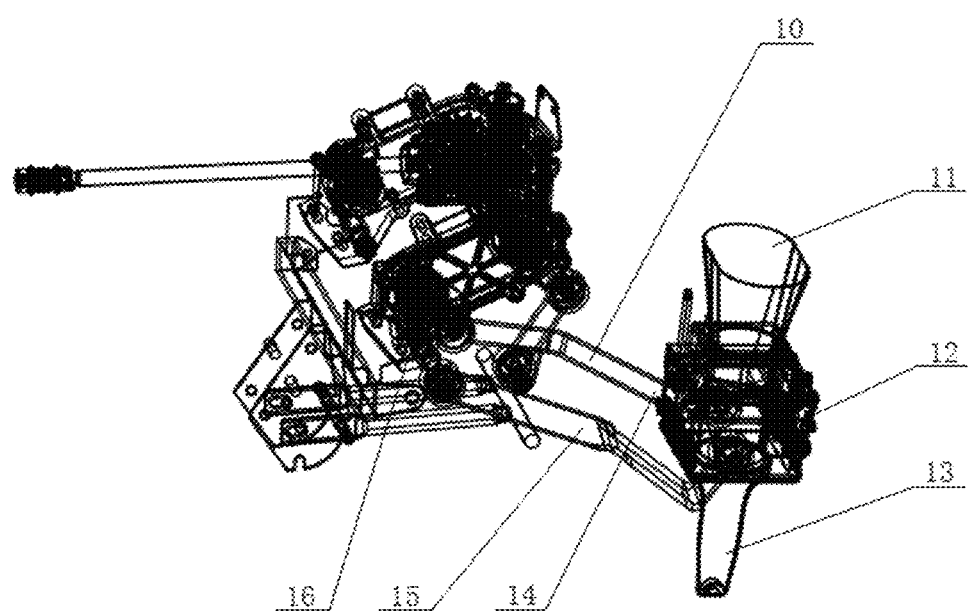
FIG. 6 provides a schematic view of the power system and the planter of the pot seedling transplanter according to example embodiments of the present disclosure.

FIG. 4 is a structural view of the seedling separation unit 2 for an automatic adjustable pot seedling feeding speed device in this present disclosure. The seedling separation unit 2 has a seedling separation rod 2-1, a support seat 2-2, a reset spring 2-3, an adjustment plate 2-4, a guide post 2-5, a brake cable 2-6, and a sleeve tube 2-7. The seedling separation rod 2-1 and the guide post 2-5 are connected separately to the adjustment plate 2-4 by using a bolt or with welding; it passes through the guide holes on the support seat 2-2, and is axially fitted with the guide holes. The entire seedling separation unit 2 is connected on the side of plate 7 by using the support seat 2-2, and bolt link or a welded joint may be used for the fixed connection between the support seat 2-2 and the side plate 7.

To facilitate the implementation of a seedling separation action, the brake cable 2-6 of the seedling separation unit 2 is located in the middle of the guide post 2-5 and the seedling separation rod 2-1. The seedling separation action of the seedling separation rod 2-1 is controlled by a planter by using the brake cable 2-6 and the sleeve tube 2-7, the seedling separation rod 2-1 being ejected can further corrects a feeding posture of a pot seedling that is about to be fed in a seedling guiding barrel of the planter, thereby improving the quality of pot seedling transplanting.

The application method of the automatic adjustable pot seedling feeding speed device of the transplanter in this present disclosure is carried out according to the following steps:

a) Firstly, the operator uses a pot seedlings shovel 1 to place a number of pot seedlings on the conveyor belt 4-1 of the conveyor unit 4 at a time. The detection sensor 3 sends detection information to the controller 5, to further drive the servo motor 4-5, by using the transmission shaft 4-4 and the conveyor belt 4-1, the pot seedling enters a pre-feeding position in front of a seedling stop rod. In this case, the detection sensor 3 detects the pot seedling and sends information to the controller 6 so that the controller 6 stops the servo motor 4-5.

b) Secondly, when a planter of the transplanter travels to a seedling receiving position under the seedling separation rod 2-1, the brake cable 2-6 is retracted, and the seedling separation rod 2-1 is ejected under the effect of the sleeve tube 2-7 and the guide post 2-5. At the same time, information is sent to the controller 6 to rotate the servo motor 4-5 over the position of one pot seedling. A pot seedling located at the pre-feeding position and the end of the conveyor belt 4-1 is moved forward under the effect of the conveyor belt 4-1, and drops in a seedling receiving barrel 11 of the planter under the effect of gravity, thereby implementing seedling feeding. At that moment when the pot seedling is dropped, the ejected seedling separation rod 2-1 corrects a feeding posture of the pot seedling by blocking the stein and leaves of the pot seedling, thereby improving the quality of pot seedling transplanting.

c) Thirdly, after the planter of the transplanter receives the seedling and travels to the seedling receiving position, the brake cable 2-6 is released, and the seedling separation rod 2-1 is returned to the position of the block pot seedling under the effect of the reset spring 2-3, until the planter travels to the seedling receiving position under the seedling separation rod 2-1 again. In this case, the detection sensor 3 detects the pot seedling and sends information to the controller 6 so as to stop the servo motor 4-5 and wait for the next time of seedling feeding. At this point, the seedling feeding system makes one complete cycle of pot seedling feeding and starts a new cycle.

d) Finally, after the operator places a last group of pot seedlings on the conveyor unit 4, the operator then prepares another group of pot seedlings and waits for an opportunity to place this group of pot seedlings on the conveyor belt 4-1 of the conveyor unit 4; this ensures the pot seedlings to be transplanted continuously. According to the foregoing order, mechanical and continuous seedling feeding of the pot seedling feeding system for a transplanter is implemented, the speed of transplanting can be greater than 60 plants per minute, which not only reduces the labor intensity of workers and the cost of transplanting operation, but also improves the efficiency of transplanter.

The embodiments are preferably implementation manners of this present disclosure. However, this present disclosure includes, but is not limited to the foregoing implementation manners, any obvious improvements, replacements or variations that can be made by a person skilled in the art without departing from the substantial content of the present disclosure fall within the protection scope of the present disclosure.

The invention claimed is:

1. An automatic adjustable pot seedling feeding speed device, comprising:
   a conveyor unit comprising a transmission shaft, a conveyor belt, a tensioning shaft, and one or more bearings;
   a pot seedlings shovel;
   a seedling separation unit configured to separate and correct a feeding posture of a pot seedling;
   a detection sensor configured to detect whether the pot seedling reaches a seedling separation position;
   a controller;

side plates, wherein the side plates are folded trumpet shape so that an operator can place a number of pot seedlings on the conveyor belt of the conveyor unit at a time; and support stands, wherein the tensioning shaft and the transmission shaft are configured to keep the conveyor belt in a tensioned work state.

2. The automatic adjustable pot seedling feeding speed device of claim 1, wherein the controller is configured to drive the conveyor belt via a step motor, a numerically controlled hydraulic motor, or a pneumatic motor.

3. The automatic adjustable pot seedling feeding speed device of claim 1, wherein the side plates have a straight edge.

4. The automatic adjustable pot seedling feeding speed device of claim 1, wherein the conveyor unit allows an operator to place multiple pot seedlings simultaneously; thereby relieving excessive fatigue caused by frequent repetitive actions.

5. The automatic adjustable pot seedling feeding speed device of claim 1, wherein the conveyor unit further comprises a servo motor configured to drive the conveyor belt, and wherein the controller is configured to control operation of the servo motor.

6. The automatic adjustable pot seedling feeding speed device of claim 5, wherein the seedling separation unit comprises a seedling separation rod, a support seat, a reset spring, an adjustment plate, a guide post, a brake cable, and a sleeve tube configured to separate and correct a feeding posture of a pot seedling.

7. The automatic adjustable pot seedling feeding speed device of claim 6, wherein the seedling separation rod and the guide post are connected to the adjustment plate, wherein the seedling separation rod and the guide post pass through guide holes defined by the support seat, and wherein the support seat is secured on one of the side plates.

8. The automatic adjustable pot seedling feeding speed device of claim 7, wherein the detection sensor is connected to the side plate at a pot seedling pre-feeding position and configured to send an instruction to the controller to run or stop the servo motor; wherein when the detection sensor does not detect a pot seedling, the detection sensor is configured to send an instruction to run the servo motor in order to transfer a pot seedling to the seedling separation rod at the pre-feeding position to wait for seedling feeding; wherein when the detection sensor detects that a pot seedling reaches the pre-feeding position or a pot seedling exists at the pre-feeding position, the detection sensor is configured to send an instruction to stop the servo motor to prevent the pot seedling from being damaged due to running of the conveyor belt.

9. The automatic adjustable pot seedling feeding speed device of claim 8, wherein the seedling separation unit is mounted on one of the side plates at a first end of the conveyor unit that is lower compared to a second end of the conveyor unit, wherein the brake cable of the seedling separation unit is controlled by a brake cable position switch; wherein when a seedling receiving barrel of the planter moves to a seedling receiving position under the seedling separation rod, the brake cable is controlled via the brake cable position switch, and wherein when the seedling separation rod is ejected, the servo motor contemporaneously drives the conveyor belt to move a pot seedling along the conveyor belt.

10. The automatic adjustable pot seedling feeding speed device of claim 9, wherein the brake cable is in the middle of the guide post and the seedling separation rod; and wherein the seedling separation rod is configured to correct a drop posture of the pot seedling falling into the seedling receiving barrel.

11. The automatic adjustable pot seedling feeding speed device of claim 10, wherein the seedling separation rod is controlled by the planter by using the brake cable and the sleeve tube.

12. The automatic adjustable pot seedling feeding speed device of claim 11, wherein the seedling separation rod is ejected to correct the drop posture of the pot seedling.

13. The automatic adjustable pot seedling feeding speed device of claim 5, wherein the controller is configured to control operation of the servo motor based on a control signal received from the detection sensor and another control signal received from the seedling separation unit.

14. The automatic adjustable pot seedling feeding speed device of claim 1, wherein the automatic adjustable pot seedling feeding speed device is configured to accommodate one or more rows of pot seedlings.

15. A method for operating an automatic adjustable pot seedling feeding speed device, the method comprising:

placing, with a pot seedlings shovel of the automatic adjustable pot seedling feeding speed device, a pot seedling on a conveyor belt of a conveyor unit of the automatic adjustable pot seedling feeding speed device;

providing, by a detection sensor of the automatic adjustable pot seedling feeding speed device, detection information to a controller of the automatic adjustable pot seedling feeding speed device;

responsive to receiving the detection information, providing, by the controller, an instruction to operate a servo motor of the conveyor unit to move the pot seedling along the conveyor belt to a pre-feeding position, wherein the pre-feeding position is located in front of a seedling separation rod of a seedling separation unit of the automatic adjustable pot seedling feeding speed device;

detecting, by the detection sensor, the pot seedling in the pre-feeding position;

responsive to detecting the pot seedling in the pre-feeding position, providing, by the controller, an instruction to stop the servo motor;

when a planter is in a seedling receiving position located under the seedling separation rod, retracting a brake cable of the seedling separation unit so that the seedling separation rod is ejected under the effect of a sleeve tube of the seedling separation unit and a guide post of the seedling separation unit;

while the seedling separation rod is ejected, providing, by the controller, an instruction to operate the servo motor so that the pot seedling moves along the conveyor belt and drops in a seedling receiving barrel of the planter under the effect of gravity;

while the pot seedling is dropped, correcting, by the seedling separation rod, a feeding posture of the pot seedling by blocking a stem of the pot seedling and leaves of the pot seedling; and after receiving the pot seedling in the seedling receiving barrel, releasing the brake cable so that the seedling separation rod is returned to an initial position in which the seedling separation rod to block additional pot seedlings on the conveyor belt from dropping into the seedling receiving barrel.

* * * * *